United States Patent [19]
Faber

[11] 3,965,553

[45] June 29, 1976

[54] TOOLHOLDER

[75] Inventor: Kurt Heinrich Albert Erich Faber, Sandviken, Sweden

[73] Assignee: Sandvik Aktiebolag, Sandviken, Sweden

[22] Filed: Oct. 10, 1975

[21] Appl. No.: 621,599

[30] Foreign Application Priority Data

Oct. 18, 1974 Sweden .............................. 7413133

[52] U.S. Cl. .................................................. 29/96
[51] Int. Cl.² ............................................ B26D 1/00
[58] Field of Search ........................................ 29/96

[56] References Cited
UNITED STATES PATENTS

| 3,192,603 | 7/1965 | Greenleaf | 29/96 |
| 3,341,923 | 9/1967 | Kelm | 29/96 |
| 3,807,007 | 4/1974 | Lindskog | 29/96 |

*Primary Examiner*—Leonidas Vlachos
*Attorney, Agent, or Firm*—Pierce, Scheffler & Parker

[57] ABSTRACT

A tool holder for clamping an apertured cutting insert in an insert-receiving site in a holder body a provision of a clamping pin rotatably and pivotally received in a bore in the holder while extending into the aperture of the insert. The pin is axially disposed in the holder and provided with a threaded portion engageable in a locking plate fixed in an enlarged portion of the bore. When the pin is screwed into the locking plate it pivots into a position wherein the plate abuts against a shoulder abutment in the bore while a portion of the pin projecting into the insert urges the latter against lateral abutment in the site.

6 Claims, 2 Drawing Figures

U.S. Patent June 29, 1976 3,965,553

TOOLHOLDER

The present invention relates to a tool holder for detachably affixing a cutting insert thereto by means of a locking pin that acts as a lever and enters into an aperture in the insert.

Various pinholders are already known in which adjustable pressure means are arranged to engage with the pin so as to turn it about its pivot. Toolholders of said type heretofore known have, however, been unsatisfactory in various aspects. For example, the insert is oftentimes not able to be as firmly and safely secured in its site as desired. One problem is to keep the height of the holder shank as low as desired and yet obtain a sufficiently large clamping force. Also it is desirable to achieve a simultaneous clamping of the insert and the shim plate.

An object of the present invention is to provide a simple solution of above related problems in toolholders. This is achieved by a toolholder that is given significant features in accordance with the appending patent claims.

Figure 1:
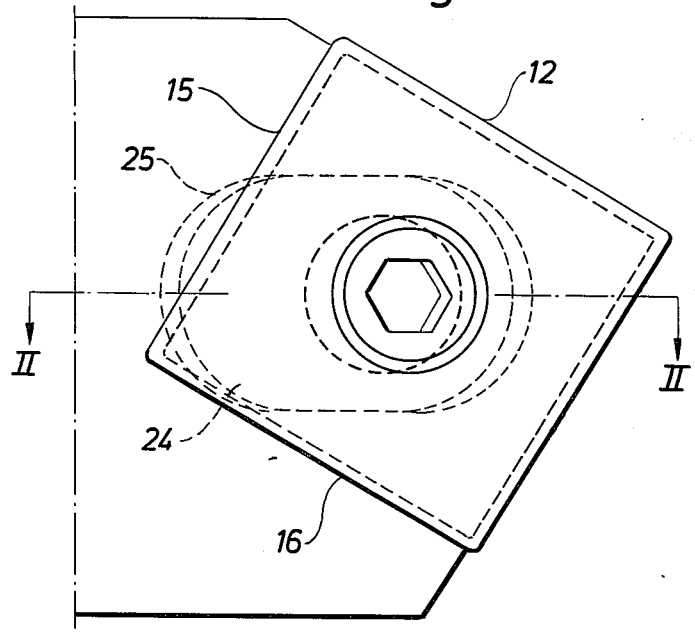
Figure 2:
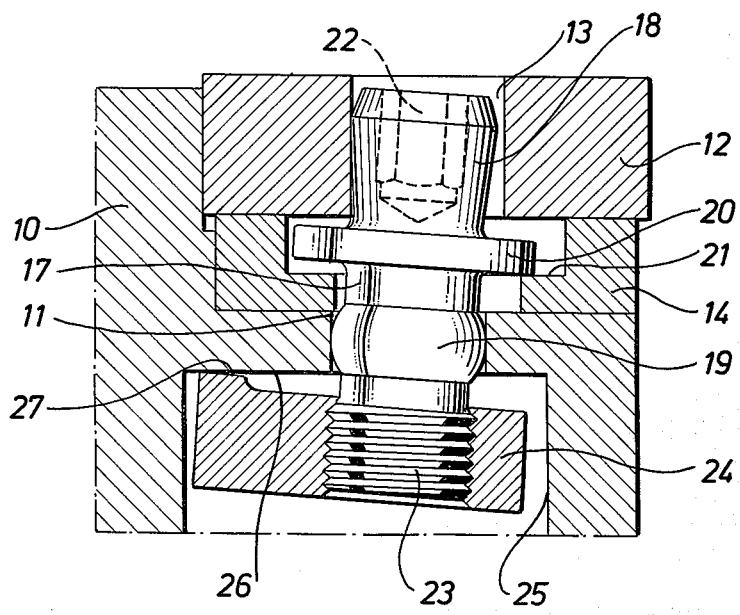

The invention will now be specifically described by way of a preferred embodiment and with reference to the accompanying drawing, in which FIG. 1 is a plan view of a toolholder according to the invention; and FIG. 2 is a sectional view along the line II—II of the toolholder in FIG. 1.

Referring to the drawing, a toolholder comprises a shank 10 having at one end an insert-receiving site. A bore 11 leads to the bottom of said site. An indexable cutting insert 12, having a central aperture 13 through it, is received in the site. The base surface of the site is formed by a detachable shim plate 14. The site presents two lateral abutment surfaces 15 and 16. A locking pin 17 is disposed in seating engagement in bore 11 and projects with its end portion 18 into the aperture 13 of the insert.

Locking pin 17 is at clamping arranged to function as a double-armed lever. For this purpose said pin is rotatably and pivotably disposed in seating engagement in bore 11 at a convexly rounded, enlarged section 19 which is disposed with a close fit in bore 11. The pin is also supported axially by means of a radially enlarged collar 20 which is disposed to rest against a radially extending bottom surface 21 of a recess in shim plate 14. The pin is also provided with a polygonal grip 22 to enable simple turning and clamping.

As its lower end portion locking pin 17 is provided with a threaded portion 23 adapted to engage with a correspondingly threaded and non-rotatably arranged locking plate 24. For the purpose of receiving said plate, bore 11 presents a lower portion 25 of enlarged section. Due to this a radially extending shoulder 26 is presented against which said plate 24 abuts axially when inscrewing the pin 17.

For the purpose of having the locking plate nonrotatably arranged, said bore and said plate are eccentrically enlarged inwardly towards the holder body, suitably by a formation oval in shape. At the same time there is provided axially such a gap that the locking plate is able to pivot in clamping. This is achieved by providing a raised portion 27, on said plate 24, adapted to abut against aforesaid shoulder abutment 26.

It is to be understood that the plate 24, instead of being oval, may have another suitable formation, polygonal for instance, provided the plate is non-rotatably received in a correspondingly configured portion of the bore 11.

The portion of bore 11 in which the pin is engaged with a close fit is eccentrically disposed relative to the aperture 13 in the insert so that the pin, during insert replacement, is pivoted in clockwise direction in FIG. 2. When in-screwing the pin 17 the radial collar 20 provided thereon is brought into abutment with the opposed recess 21 in the shim plate. At the same time the locking plate is pivoted into a position where the raised portion thereon abuts axially against shoulder abutment 26 and the end portion of the pin projecting into the aperture 13 engages therewith and urges the insert against its lateral abutments. In connection herewith there is such arrangement that the pin is able to pivot into clamped position essentially without bending thereof.

For obvious reasons, the advantages inherent in a toolholder as hereinbefore described are essential. A considerable lowering of the height of the holder, compared with prior holders, is now achievable and at the same time it is possible to effect effective clamping of both insert and shim plate. Another essential effect is that it is possible to maintain a constant bending moment in clamping. This is essential in comparison with prior pinholders where a thread pin is received with loose threaded engagement in the holder body which causes a successive decrease of bending moment when the pin is in-screwed. A further advantage is that the holder body is now easier to manufacture than most of the prior holders.

I claim:

1. Toolholder for clamping an apertured cutting insert (12) into an insert-receiving site in a holder body so that the insert rests on a base surface and engages with at least one lateral abutment surface, there being a clamp pin (17) rotatably and pivotably received in a bore (11) in the holder while extending into the aperture (13) of the insert, characterized in that the pin is supported axially in the holder and provided with a threaded portion (23) threadedly engageable by a locking plate (24), said plate being non-rotatably received in an enlarged portion of the bore (11), said arrangement being such that said plate, when said pin is in-screwed, pivots into a position where said plate is caused axially to abut against a shoulder abutment (26) in the bore at the same time as the portion (18) of the pin projecting into the aperture of the insert engages therewith and urges the insert against its lateral abutment or abutments.

2. Toolholder according to claim 1, wherein the locking plate (24) and the portion (25) of the bore (11) in which the locking plate is received are eccentrically enlarged inwardly towards the holder body.

3. Toolholder according to claim 1, wherein the locking plate (24) and the portion (25) of the bore (11) in which it is received are oval in shape.

4. Toolholder according to claim 1, wherein the pin (17) is supported axially by a radial collar (20) thereon which abuts against a radially extending bottom surface (21) of a recess in the holder.

5. Toolholder according to claim 1, wherein the locking plate (24) is provided with an axially raised portion (27) adapted to abut against said shoulder abutment (26) provided as a radially extending surface in the holder.

6. Toolholder according to claim 1, wherein the pin (17) is engaged with close fit in a portion of the bore (11) which is eccentrically disposed relative to the aperture (13) of the insert.

* * * * *